Feb. 15, 1927.  
J. ROCHET  
1,617,965  
PROCESS FOR THE MANUFACTURE OF HYDROGEN  
Filed Feb. 17, 1925  
2 Sheets-Sheet 1

INVENTOR:-  
JOSEPH ROCHET  
by his Attorneys  
Howson and Howson

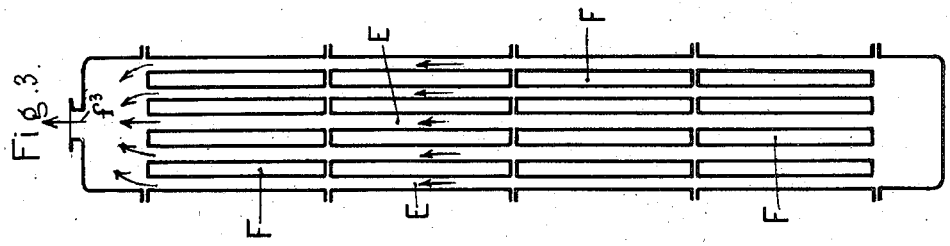
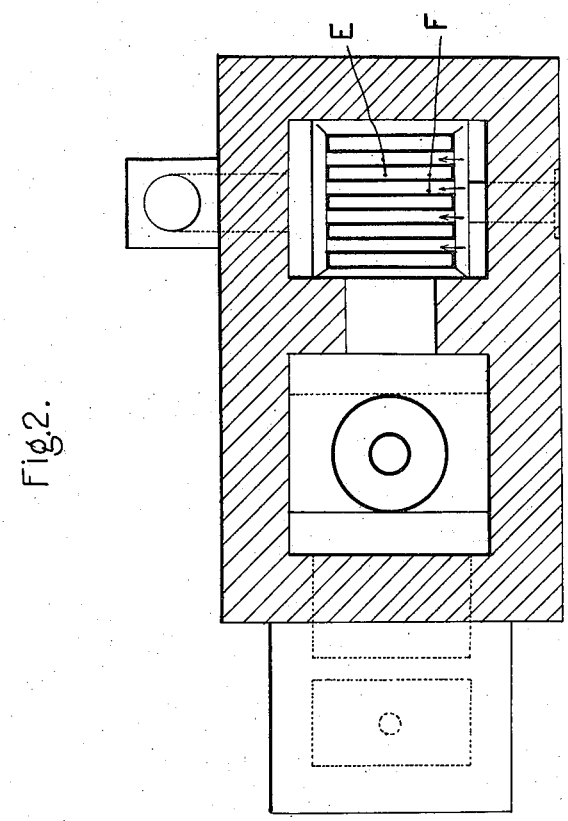

Patented Feb. 15, 1927.

1,617,965

UNITED STATES PATENT OFFICE.

JOSEPH ROCHET, OF PARIS, FRANCE, ASSIGNOR TO COMPAGNIE DE PRODUITS CHIMIQUES ET ELECTROMETALLURGIQUES-ALAIS FROGES ET CAMARGUE, OF PARIS, FRANCE, A CORPORATION.

PROCESS FOR THE MANUFACTURE OF HYDROGEN.

Application filed February 17, 1925, Serial No. 9,870, and in France April 11, 1924.

One known method of preparation of hydrogen consists in passing a current of water vapour over metallic iron in suitable conditions of speed and temperature, and in then reducing the oxide of iron formed by a reducing gas, such as producer gas, generated either with air alone, or with a mixture of air and water vapour, water gas, coal gas, blast furnace gas, etc.

The obtaining of pure hydrogen, practically free from carbon monoxide, is more difficult to effect when the reducing gas contains hydrocarbons, than is the case for lighting gas, coke oven gas, etc., having regard to the secondary reactions and the decompositions which may be produced. For example, if certain precautions are not taken, there is formed during the reduction phase a deposit of carbon, which when the water vapour is again passed gives a certain quantity of carbon monoxide, the quantity varying according to the proportions of water vapour.

In order to reduce to the minimum the deposit of carbon, it is particularly advantageous to operate under conditions of temperature which follow from the known laws of equilibrium and to keep the temperature as constant as possible in the whole reacting mass throughout the whole duration of the reaction. If, at certain points, the temperature falls too low, there may arise inter alia, especially in the presence of oxide of iron, the decomposition of a portion of the carbon monoxide with formation of carbon and carbon dioxide. If the temperature is too high, the hydrocarbons are liable to decomposition with a deposit of carbon, a part of which may yield carbon monoxide during the oxidizing phase.

It has heretofore been proposed to put the metallic reaction mass in a chamber consisting of an annular space of relatively thin transverse section formed between two cylindrical spaces which serve to heat this chamber on its internal and external walls.

In these arrangements, it has been the reducing gas itself which serves for heating the spaces between which is located the annular chamber containing the reaction mass. The period of reduction takes place in two steps. The reducing gas traverses the reaction mass successively in opposite directions in order to heat the two spaces, which latter are furnished with checker work serving as heating recuperators. A uniform temperature cannot be obtained during the phases of reduction and oxidation of the reaction mass. One cannot utilize the gases of high value resulting from the reduction phase,—on the contary the operation of reduction in two phases complicates the apparatus, augments the number of pipe valves or the like and multiplies the number of operations.

In the process according to the invention throughout the duration of the whole process the heating gases are continuously following a circuit outside the reaction mass absolutely independent of the reducing gas and the water vapour. The heating gas can never be in contact with any part of the reaction mass. The annular chamber containing this reaction mass has no communication with the spaces traversed by the heating gas. This annular chamber is provided with an opening only at each extremity for the circulation of the water vapour and the reducing gas.

The annexed drawing represents by way of example a preferred form of apparatus for carrying out this process.

Figure 2 is a section along 2—2 of Figure 1.

Figure 3 represents in vertical section, separately, the heat recuperator shown in Fig. 1.

Figure 1:
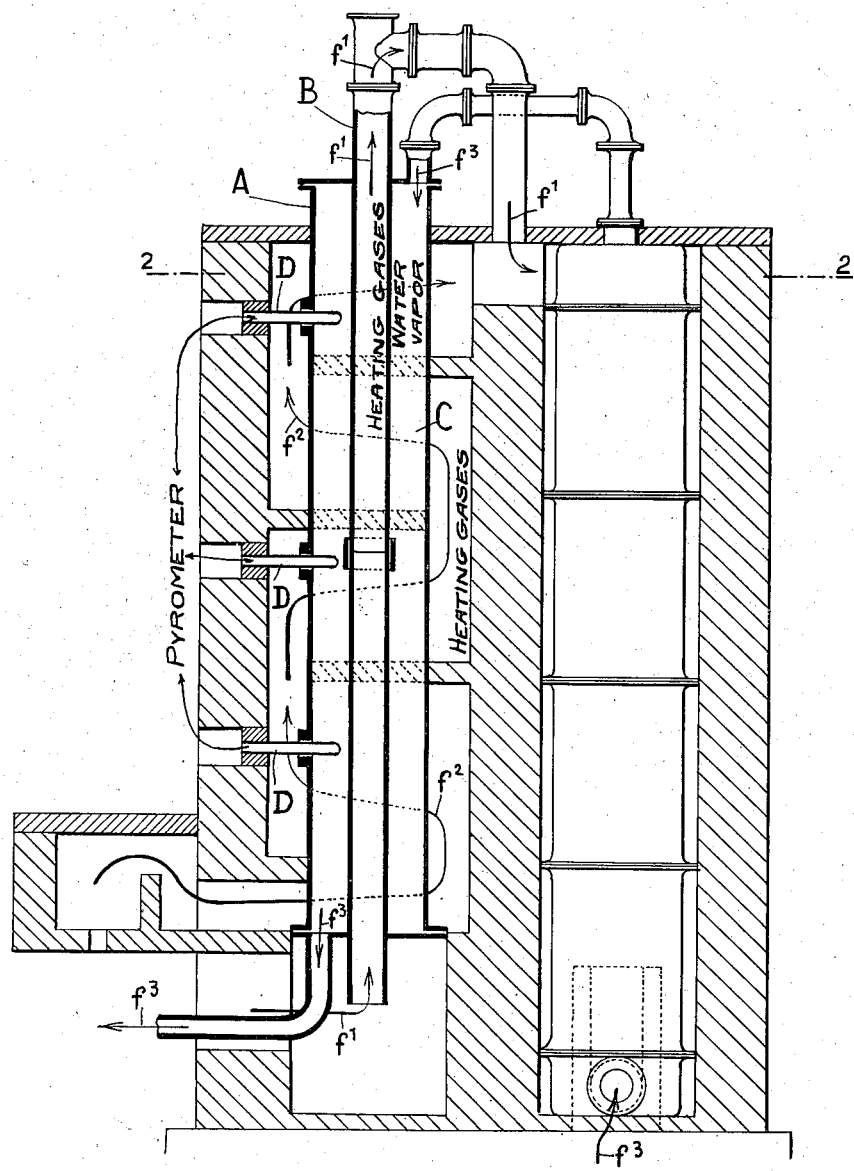
Fig. 1 is a general view of the apparatus, the reaction apparatus proper being shown in vertical section and the heat recuperator in external elevation.

In Figure 1, the apparatus serving to manufacture hydrogen is constituted by two concentric vertical tubes A and B, preferably of great height (4 to 5 metres); the annular space C reduced to some centimetres (10 to 20 centimetres for example) is charged with the reacting mass consisting of metallic iron in the form of pieces of 10 to 40 mm. width and of a surface as large as possible. Heating is effected both by the interior of the central tube B and by the exterior of the tube A of larger diameter.

Experiments have shown that with cylindrical tubes and an annular space measuring up to 17 centimetres, the distribution of temperature in the interior of the mass is practically uniform. The annular space may be substantially increased if there are employed, instead of cylindrical tubes, corrugated or undulated tubes, or tubes having ribs extending preferably in the vertical direction so as to allow of readily replacing the reacting mass.

It will be understood that with this system, the heating surfaces having parts which penetrate to the interior of the reacting mass, the volume of the reaction chamber can be materially increased and therefore also the capacity of the apparatus for production, and a constant temperature can be obtained, the mass being always heated in thin layers.

The corrugated shape may be confined to the interior tube in such a way that this tube possesses a heating surface substantially equal to that of the outer tube. Whatever be the arrangement adopted, it is always advantageous to have substantially equal heating surfaces on the two sides of the material.

The progress of the operation is as follows:

The reacting mass, arranged in the space C, is raised to a constant and uniform temperature by the heating gases passing in the interior of the tube B along the path indicated at $f^1$ and in the space surrounding the tube A by a baffled circulation in the direction $f^2$; water vapor is supplied to the space C which it traverses along the path shown by the arrows $f^3$. When the oxidizing period is terminated, the current of water vapour is stopped and replaced by a current of reducing gas, such as producer gas, water gas, coal gas, etc. likewise circulating in the direction of the arrows $f^3$. The water vapour may moreover be circulated in the opposite direction to the reducing gas. A certain number of pyrometers D are arranged at different levels.

The reaction apparatus itself is followed by a heat recuperator (see particularly Figs. 2 and 3). This recuperator is made by the superposition of a plurality of elements or caissons, each of which is divided by parallel vertical partitions into narrow chambers of which the ones E serve for the vertical circulation and the others F serve for the horizontal circulation. The chambers E are open at their upper and lower ends and are bounded laterally by four walls. The chambers F for the horizontal circulation are closed at their upper and lower ends by horizontal partitions but their two lateral extremities are open. The flanges permit simple gas tight connections between the adjoining units.

The gas having served to heat the reaction apparatus (follow the arrow $f^1$ and $f^2$ on Fig. 1) passes into the recuperator, circulating in the horizontal chambers F of this recuperator and abandoning its heat either to the reducing gas or to the water vapor whose circulation is caused from bottom to top in the super-imposed vertical chambers E. The reducing gases and the water vapour thus enter the reaction apparatus at a temperature very near to the reaction temperature with the result that the temperature is very uniform throughout the whole of the reaction zone.

This process presents the following advantages, amongst others:

1. The obtaining of constant and uniform temperature either during the reduction phase or during the oxidation phase. This is particularly important when one wishes to obtain pure hydrogen from oil gas or gas containing hydrocarbons. This constancy of temperature is obtained by the complete independence of the circuits of the heating gas and the reaction gas, by the employment of surface regenerators and by the fact that the heating is very methodical. The heating gas after having raised the reaction chamber to a suitable temperature reheats the reducing gas and the water vapour, which is coming in the opposite direction, to a temperature in the neighborhood of the reaction temperature. Raising and lowering of the temperature, which favors the secondary reactions harmful to the purity of the hydrogen, is thus avoided.

2. Better utilization of the heating gases with economy in calories for the heating.

This results from the fact that the gas serving for heating—which may be any gas desired—leaves the apparatus after having tranferred its calories to the reducing gas or to the water vapour which enters in the opposite direction, then leaving at what may be called a low temperature (in the neighborhood of 200°).

3. Long life to the castings, metals or alloys used in the construction of the apparatus, by reason of the fact that the temperature is regular and uniform and that the dangers of overheating are not to be feared.

What I claim is:

In a process for the manufacture of hydrogen by the alternate reduction of water vapour by metallic iron and of the resulting oxide of iron by reducing gases, in which the reacting mass is arranged in an annular space of a relatively narrow sectional area, formed between two cylindrical vessels serving for the heating of this chamber upon its external and internal walls,—the method consisting in continuously passing, during the whole period of the process, the heating gases, externally to the reacting mass, along a circuit completely independent of the circuit of the water vapour and of the reducing gases, and preventing any contact of the heating gases with the reacting mass, for the purpose described.

In testimony whereof I have signed my name to this specification.

JOSEPH ROCHET.